(12) United States Patent
Meerbeek et al.

(10) Patent No.: US 10,772,176 B2
(45) Date of Patent: Sep. 8, 2020

(54) IMAGE-BASED LIGHTING

(71) Applicant: SIGNIFY HOLDING B.V., Eindhoven (NL)

(72) Inventors: Berent Willem Meerbeek, Veldhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/466,108

(22) PCT Filed: Nov. 23, 2017

(86) PCT No.: PCT/EP2017/080218
§ 371 (c)(1),
(2) Date: Jun. 3, 2019

(87) PCT Pub. No.: WO2018/099799
PCT Pub. Date: Jun. 7, 2018

(65) Prior Publication Data
US 2019/0289697 A1 Sep. 19, 2019

(30) Foreign Application Priority Data

Dec. 2, 2016 (EP) .................................. 16201892

(51) Int. Cl.
*H05B 47/105* (2020.01)
*G06F 16/587* (2019.01)
*G06F 16/51* (2019.01)
*G06F 16/535* (2019.01)
*H05B 47/19* (2020.01)

(52) U.S. Cl.
CPC .......... *H05B 47/105* (2020.01); *G06F 16/51* (2019.01); *G06F 16/535* (2019.01); *G06F 16/587* (2019.01); *H05B 47/19* (2020.01)

(58) Field of Classification Search
CPC ........... H05B 37/0227; H05B 37/0272; G06F 16/535; G06F 16/51; G06F 16/587
USPC ......................................................... 315/294
See application file for complete search history.

(56) References Cited

U.S. PATENT DOCUMENTS

| 5,751,286 A | 5/1998 | Barber et al. |
| 2003/0231806 A1 | 12/2003 | Troyanker |
| 2013/0321448 A1* | 12/2013 | Gritti ................. H05B 37/0218 345/589 |

(Continued)

FOREIGN PATENT DOCUMENTS

| WO | 2008146245 A1 | 12/2008 |
| WO | 2012085742 A1 | 6/2012 |

(Continued)

*Primary Examiner* — Don P Le
(74) *Attorney, Agent, or Firm* — Meenakshy Chakravorty

(57) ABSTRACT

A method of searching an image database for images to be used in rendering lighting scene in an environment by at least one luminaire within the environment, the method comprising: receiving a search trigger comprising at least one indication of a user preference; identifying at least a position of the at least one luminaire within the environment; responsive to receiving said search trigger, searching the image database based on both the indicated user preference and the identified position to return at least one image for use in rendering the lighting scene by the at least one luminaire.

13 Claims, 6 Drawing Sheets

(56) References Cited

U.S. PATENT DOCUMENTS

2013/0321488 A1 12/2013 Affolter et al.
2015/0278896 A1 10/2015 Seuntiens et al.
2018/0279446 A1 9/2018 Van De Sluis et al.
2018/0376564 A1 12/2018 Van De Sluis et al.

FOREIGN PATENT DOCUMENTS

WO 2014087274 A1 6/2014
WO 2016050539 A1 4/2016

* cited by examiner

| Lighting Infrastructure Annotation | Lighting Effect Annotation |
|---|---|
| Ceiling light | Sky, cloud, ... |
| Horizontal light strip | Horizon, line, ... |
| Bedside lamp | Relax, sleep, wake-up, ... |
| Light [output]>1000lm | Sun, summer, beach, ... |
| Light [beamwidth] <45° | Silhouette, shadow, sunbeam, ... |
| Light [type]=colour | Red, blue, green, purple, ... |

User takes a snapshot of the room in which he wants to create a lighting effect
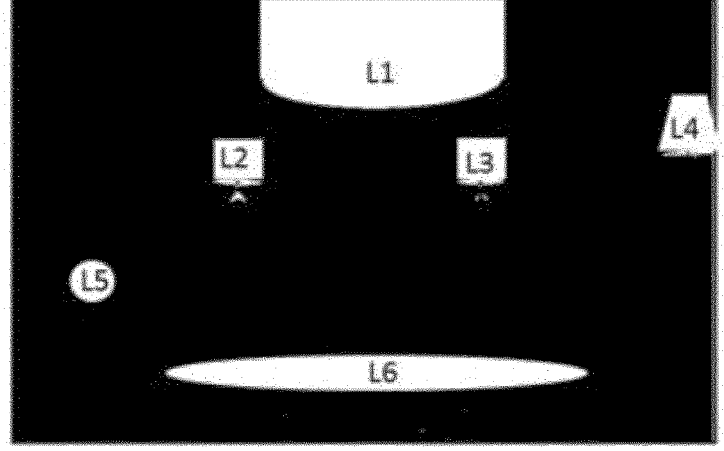
Light sources are identified and annotated
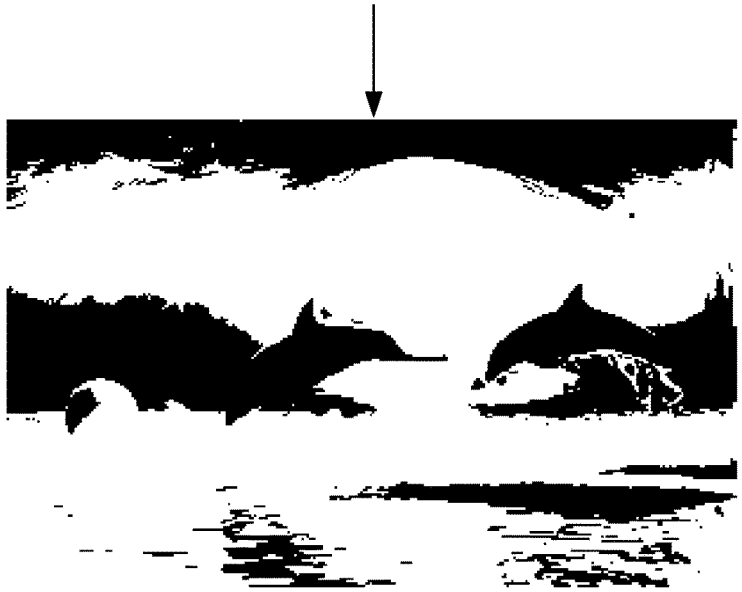
Images are selected with relevant features in the regions of interest
Figure 7

IMAGE-BASED LIGHTING

CROSS-REFERENCE TO PRIOR APPLICATIONS

This application is the U.S. National Phase application under 35 U.S.C. § 371 of International Application No. PCT/EP2017/080218, filed on Nov. 23, 2017, which claims the benefit of European Patent Application No. 16201892.3, filed on Dec. 2, 2016. These applications are hereby incorporated by reference herein.

TECHNICAL FIELD

The present disclosure relates to determining an image from which to generate a lighting scene in an environment.

BACKGROUND

"Connected lighting" refers to a system of luminaires which are controlled not by (or not only by) a traditional wired, electrical on-off or dimmer circuit, but rather via a wired or more often wireless network using a digital communication protocol. Typically, each of a plurality of luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). For instance the lighting control device may take the form of a user terminal, e.g. a portable user terminal such as a smartphone, tablet, laptop or smart watch; or a static user terminal such as a desktop computer or wireless wall-panel. In such cases the lighting control commands may originate from a lighting control application ("app") running on the user terminal, based on user inputs provided to the application by the user through a user interface of the user terminal (e.g. a touch screen or point-and-click interface). The user device may send the lighting control commands to the luminaires directly, or via an intermediate device such as a wireless router, access point or lighting bridge.

As connected lighting systems comprise a multitude of lighting devices or lighting nodes which are each individually controllable, it can be challenging for a user to create a desired light scene easily. It is known to use a connected lighting system to generate a lighting scene based on an image selected by a user. The image could be a still image or moving image. It could be a captured image (photograph or filmed video) or could be a user created image (e.g. drawing or animation). In such cases the lighting control application samples ("picks") the colour and/or brightness values from one or more points or areas in the image, then uses these to set the colour and/or brightness levels of the illumination emitted by the luminaires providing the lighting scene. For instance the user may select a scene that has inspired him or her, such as an image of a forest or sunset, and the application sets the lighting based on this so as to recreate the colours of the image and therefore recreate the atmosphere of the scene shown in the image.

WO 2016/050539 discloses a method and system for generating and controlling a lighting scene of an environment based on a user preference and one or more images of the environment.

In one known implementation, the lighting control application automatically extracts the dominant colours from the image and assigns them randomly to individual lighting devices, thereby recreating a lighting scene giving a feel of that shown in the image. In another implementation, the lighting control application knows the positions or at least relative positions of the luminaires within the environment in question (e.g. room) and maps each to a corresponding point in the image. It then treats each of the luminaires as a "lighting pixel" to recreate an approximation of the image in the environment. In other more advanced implementations, image processing is used to identify segments within an image which can be mapped to specific lighting devices within an environment which are suitable for rendering that segment.

SUMMARY

Currently, in order to render a lighting scene based on an image, a user must find one or more images themselves, for example from a lighting image library service or from their camera roll, and try out how the colors are extracted from the image and mapped to the lights in the room.

To find an image, the user may perform a search in an image database based on a keyword (e.g. enabled by an external image database such as Flickr). For example, the user wishing to render a "sunset" scene consisting of reds and yellows within his home may search an image database using the keyword "sunset" which returns a set of images of sunsets which can then be used by a lighting app to determine settings for each lighting device in the home.

Since there may be millions or even billions of images to search from, the user may be provided with too much choice. In particular, some of the images in the search results may not be suitable for rending by the user's lighting infrastructure (or at least some images may be more suitable than others). That is, based on a specific query (e.g. a keyword input), images may be found which match very well with the query, however, the structure and content of the image may not provide a good match with the available lighting infrastructure. Hence, the user would benefit from a smart guided search to get to a satisfying end-result in an easy way.

The present invention addresses this problem by allowing the user to search for images not only based on a keyword but also on lighting infrastructure information, the results of which will be more suitable for rendering in by the user's lighting infrastructure. For instance, if a user is looking for a sunset ambience, and has a horizontal linear lighting structure available in the room, it helps to look for sunset images in which a horizontal linear pattern is present, such that the ambience which is captured in the image can more easily be approached by a light scene which is based on the image.

Hence, according to a first aspect disclosed herein, there is provided a method of searching an image database for images to be used in rendering lighting scene in an environment by at least one luminaire within the environment, the method comprising: receiving a search trigger comprising at least one indication of a user preference; identifying at least a position of the at least one luminaire within the environment; responsive to receiving said search trigger, searching the image database based on both the indicated user preference and the identified position to return at least one image for use in rendering the lighting scene by the at least one luminaire. The selection of the image is based on the salient features of the image corresponding to the relative position of two or the multiple of the luminaires.

In embodiments, the at least one luminaires is a plurality of luminaires (i.e. two or more luminaires) and the at least a position is a respective position of each of the plurality of luminaires within the environment According to a second aspect disclosed herein, there is provided a method of rendering a lighting scene in an environment comprising causing the method steps of the first aspect to be performed to return the at least one image and further comprising a step of: controlling the at least one luminaire to render the lighting scene based on the returned at least one image.

In the described embodiments, various physical structure of the luminaire(s), in particular the luminaire position(s) but also other physical properties(s) such as shape, orientation etc. is compared with image structure exhibited by the images in the database. For example, a shape, pattern, distribution or other structure formed by the luminaire or luminaires in the environment for example due to their location (relative to each other and/or the environment), shape, and/or orientation (relative to each other and/or the environment) can compared with the image structure to locate one or more images exhibiting matching structure. This comparison can be direct, using image processing to identify the matching image structure (e.g. matching shape, matching pattern, matching distribution of elements in the image, or other matching image structure) or alternatively it can be indirect, wherein one or more infrastructure keywords (that describe the luminaire structure) are generated and compared with tags associated with the images (that describe the image structure exhibited by the associated images) to locate one or more images associated with matching tag(s). The indirect comparison-based search has the advantage of search efficiency, in that it requires significantly fewer computing resources per searched image. Tags can be generated automatically using image processing in advance, for example when they are added to the database and/or tags can be added manually, for example by users when uploading the images to the database.

In embodiments, said searching the image database is performed by searching the image database to identify the at least one image as having at least one image feature which correspond to the relative position of the at least two luminaires.

In embodiments, the image database stores a plurality of images each stored in association with at least one respective tag.

In embodiments, the tags are automatically added based on historical usage. For example, using machine learning techniques.

In embodiments, said searching comprises determining an infrastructure keyword from the identified position; and searching the image database based on the user preference and the infrastructure keyword.

In embodiments, the method further comprises, in addition to identifying the position of the at least one luminaire within the environment, identifying an additional property of the at least one luminaire within the environment; and wherein said searching the image database is performed additionally based on the identified additional property.

In embodiments, the additional property is an orientation of the at least one luminaire within the environment.

In embodiments, the additional property is a shape of the at least one luminaire within the environment.

In embodiments, said user preference comprises one or more of: a keyword; a mood icon; a colour; and a colour palette.

In embodiments, said searching the image databased is performed using an Internet-based image search service.

In embodiments, said at least one luminaire is a plurality of luminaires.

In embodiments, the method further comprises steps of: if more than one image is returned from said search, presenting the more than one image to the user via a user interface; and receiving user input identifying one of the more than one image for use in said rendering.

In embodiments, said at least one property of the at least one luminaire is at least one physical property of the luminaire.

In embodiments, said at least one property of the at least one luminaire is at least one property of a light output of the at least one luminaire.

In embodiments, said at least one physical property comprises one or more of: luminaire type; luminaire spatial location within the environment; luminaire shape or luminaire orientation within the environment.

In embodiments, said at least one property of the light output comprises one or more of: light output colour; light output shape or distribution; light output maximum intensity; light output spectral composition.

According to a third aspect disclosed herein, there is provided a controller of for controlling at least one luminaire to render a lighting scene in an environment based on an image; the controller comprising: an input for receiving a search trigger comprising at least one indication of a user preference; an interface for sending control commands to the at least one luminaire; a processor arranged to: receive the search trigger; identifying at least a position of the at least one luminaire within the environment; retrieve at least one image by causing, responsive to receiving said search trigger, a search of an image database to be performed based on both the indicated user preference and the identified position; and control, via the interface, the at least one luminaire to render the lighting scene based on the retrieve at least one image.

According to a fourth aspect disclosed herein, there is provided a system comprising the controller according to the third aspect and the at least one luminaire.

According to a fifth aspect disclosed herein, there is provided a computer program product comprising computer-executable code embodied on a computer-readable storage medium configured so as when executed by one or more processing units to perform the method according to the first aspect, the second aspect, or any embodiments thereof.

According to a sixth aspect disclosed herein, there is provided a method of searching an image database for images to be used in rendering lighting scene in an environment by at least one luminaire within the environment, the method comprising: receiving a search trigger comprising at least one keyword; identifying at least one property of the at least one luminaire; responsive to receiving said search trigger, searching the image database based on both the keyword and the identified at least one property to return at least one image for use in rendering the lighting scene by the at least one luminaire.

BRIEF DESCRIPTION OF THE DRAWINGS

To assist understanding of the present disclosure and to show how embodiments may be put into effect, reference is made by way of example to the accompanying drawings in which:

FIG. 7 illustrates how colour values may be selected from an image in accordance with embodiments of the present invention.

DETAILED DESCRIPTION OF EMBODIMENTS

Figure 1:
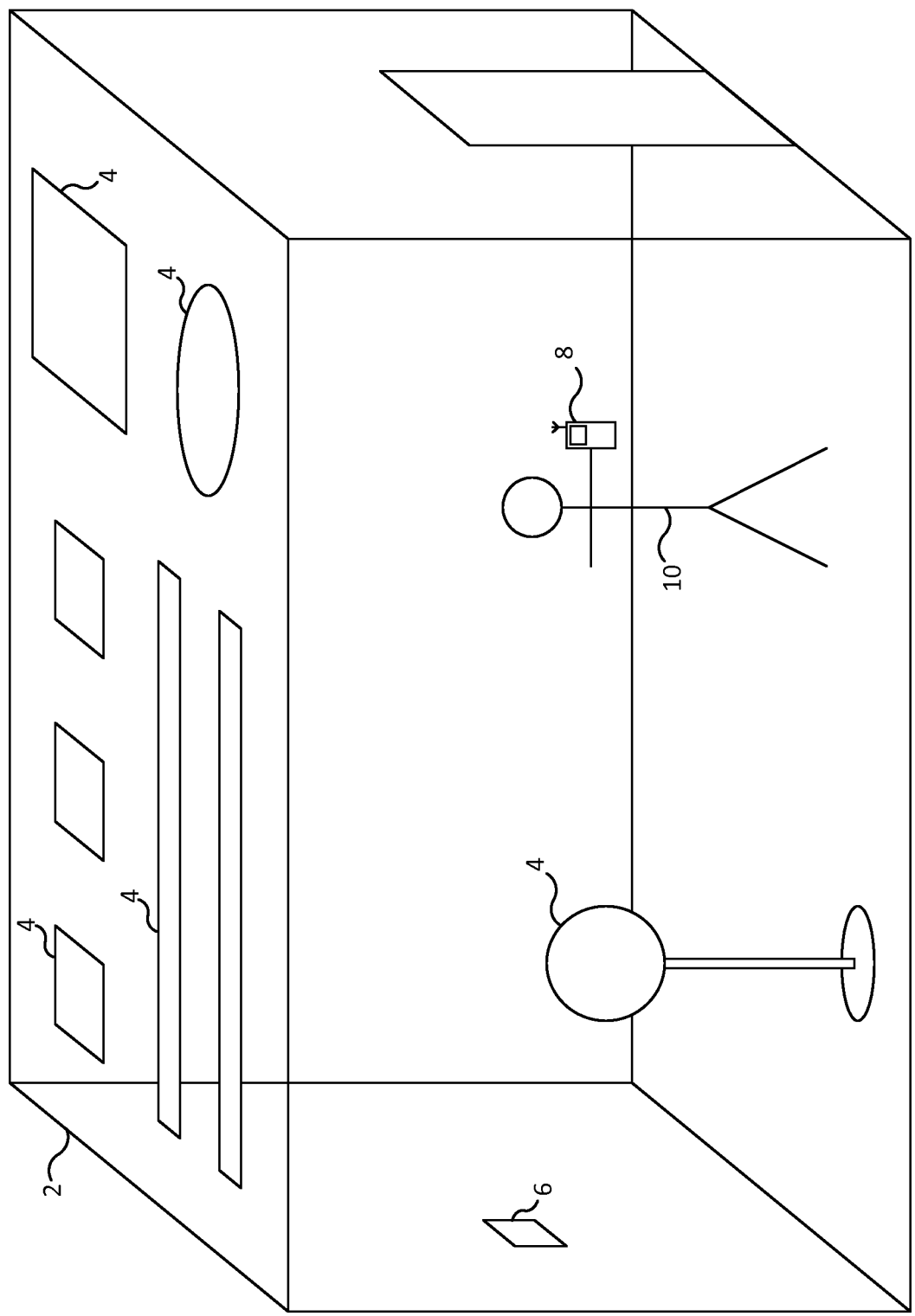
FIG. 1 is a schematic illustration of an environment equipped with a lighting system.

FIG. 1 shows a lighting system installed or otherwise disposed in an environment 2, e.g. an indoor space such as a room, or an outdoor space such as a garden or park, or a partially covered space such as a gazebo, or any other space that can be occupied by one or more people such as the interior of a vehicle. The lighting system comprises a plurality of luminaires 4, each comprising one or more lamps (illumination emitting elements) and any associated housing, socket(s) and/or support. A luminaire 4 is a lighting device for emitting illumination on a scale suitable for illuminating an environment 2 occupiable by a user. For example, each of the luminaires 4 may take the form of a ceiling mounted luminaire, wall mounted luminaire, wall washer, or a free standing luminaire (and each need not necessarily be of the same type).

Further, in accordance with the present disclosure, the luminaires 4 in the environment 2 comprise luminaires having substantially different shapes. The shape considered herein may be the overall shape of the housing of an individual luminaire 4, or the shape of an individual light emitting part (lamp) or the shape of an individual light diffusing part of an individual luminaire 4, or the shape of a group of light emitting parts or light diffusing parts of a given luminaire 4. Alternatively the shape may refer to the shape of the illumination cast by the luminaire 4 within the environment 2.

For instance, in a non-limiting example, one or more of the luminaires 4 each take the form of a long, thin strip (e.g. an LED based substitution for a fluorescent tube mounted on the ceiling), while one or more others of the luminaires take a circular or at least more rounded form (e.g. a round ceiling mounted luminaire or free standing lamp with a "blob" shaped diffuser or light shade). Embodiments in the following may be described in terms of strip lighting and round or blob shaped luminaires 4, but it will be appreciated that this is not limiting, and alternatively or additionally the luminaires 4 in question may comprise one or more substantially triangular luminaires 4, hexagonal luminaires 4, star-shaped luminaires 4, etc.

The lighting system further comprises a lighting control device 8 in the form of a user terminal with a lighting control application (or "app"). E.g. the user terminal 8 may take the form of a mobile user terminal such as a smartphone, tablet, laptop or smartwatch; or a static user terminal such as a desktop computer or wall-panel. The user terminal 8 comprises a user interface such as a touchscreen or a point-and-click interface arranged to enable a user 10 (e.g. a user present in the environment 2) to provide user inputs to the lighting control application. The user terminal 8 is arranged to connect to the lighting system via a wired networking protocol such as DMX or Ethernet or a wireless networking protocol such as ZigBee, Wi-Fi or Bluetooth.

The lighting control device 8 comprises a processor, such as a CPU or CPUs and a memory connected to the processor (not shown). The memory holds the app for execution on the processor and the app, when executed, causes the processor to carry out the function of the device 8 that are disclosed herein. Alternatively, at least some of these functions may be carried out by dedicated hardware of the device 8 such as a FPGA, application-specific integrated circuit etc.

Figure 2:
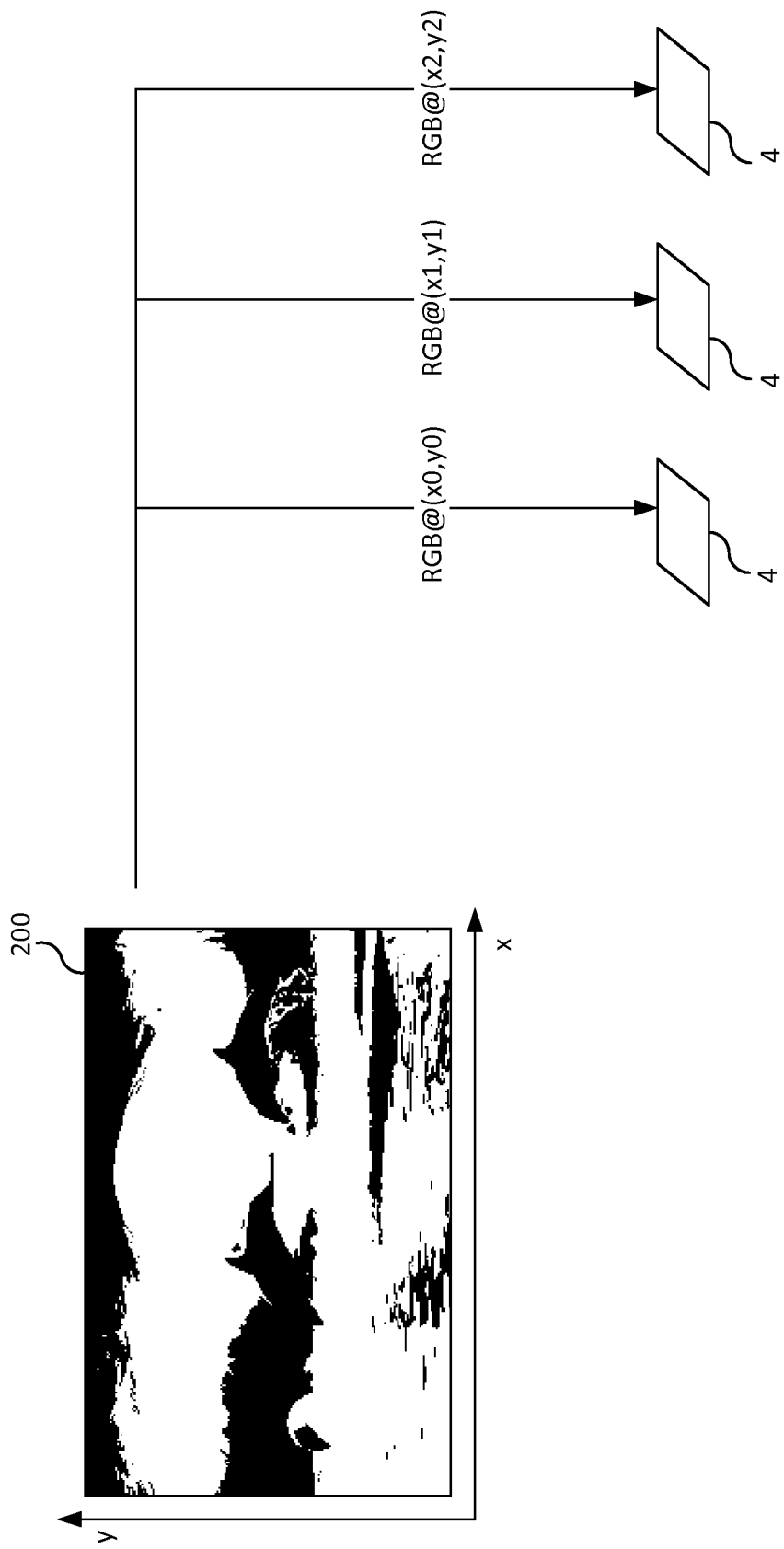
FIG. 2 illustrates selecting colour values from an image.

FIG. 2 illustrates an example selection of colour values from an image 200. The image 200 can be considered a mapping of 2D locations to colour values (e.g. RGB values). One way to derive RGB values is therefore to randomly generate a set of coordinates and "pull" the RGB value which is at that location within the image 200. This can be performed for each luminaire 4 in order to derive lighting settings to be applied to that luminaire 4 (i.e. each luminaire 4 is controlled to output the RGB colour from its respective set of coordinates, as shown in FIG. 2). Note that a similar process can be applied to 3D images, and the same 2D process can be applied to a video image. This image content might be photographic images, vector images, videos, or segments of these.

Figures 3, 4:
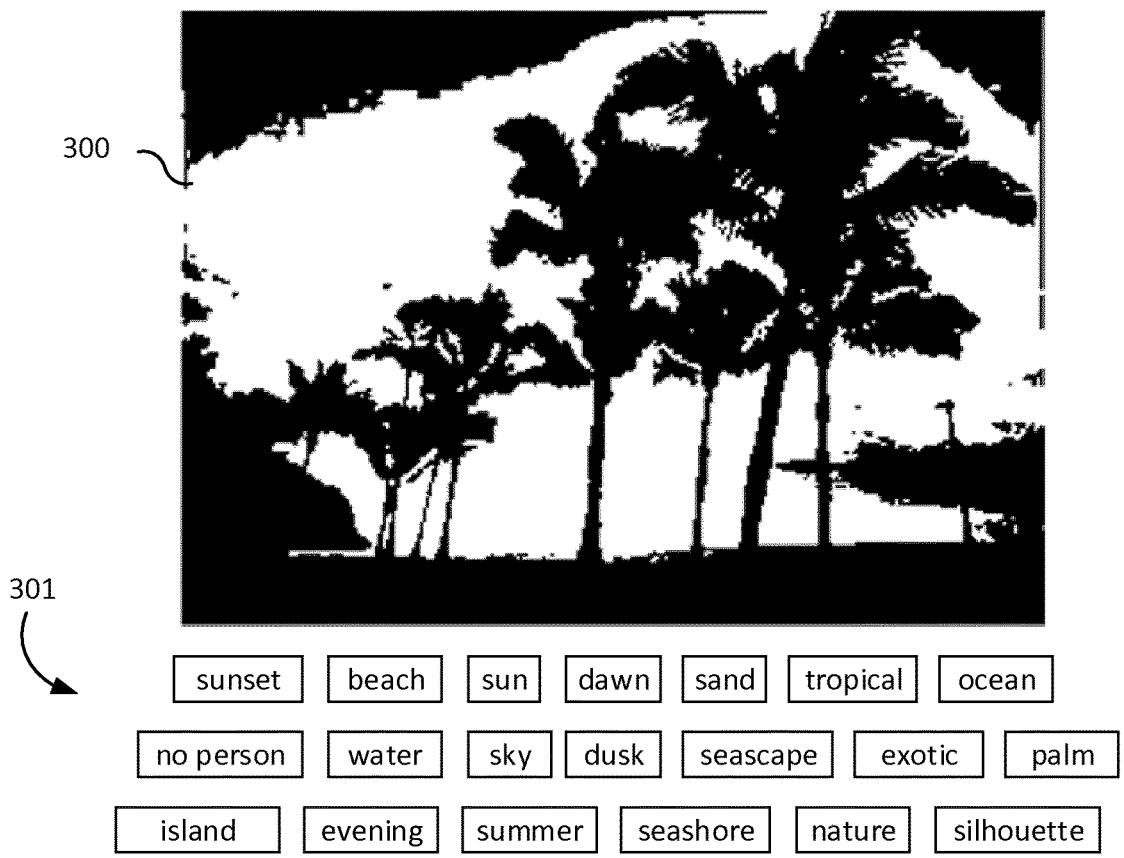
FIG. 3 is an example image with associated tags.
FIG. 4 shows example associations between infrastructure tags and light effect tags.

In general, images may be associated (e.g. stored in memory in associated with) with one or more "tags". An example of this is shown in FIG. 3. Images and associated tags may be stored in a searchable database or other memory location which is accessible by the lighting system to retrieve an image for use in rendering a lighting scene (e.g. in accordance with the method of FIG. 2 described above). This is described in more detail later.

The tags 301 are generally words which relate to the things present in the image 300, i.e. semantic content of the image 300. In this example, the image 300 is a picture of palm trees on a beach at sunset and the tags include words such as "sunset", "beach", "tropical", "ocean", "exotic" etc.

More generally, the type of tags may fall broadly into one of two categories: light effect annotations and light infrastructure annotations.

Light effect annotations relate to semantic content of the image as described above. The set of images in the database can be annotated manually by users, via image analysis techniques and/or deep learning techniques, and/or via usage history of the images by existing users. For example, users might add tags to describe what is on the images while uploading or editing their image collection. Other tags might be added automatically based image analytics and deep learning techniques. These annotations are typically related to what objects, atmospheres, and ambiances the image represent. A single keyword can be related to other keywords. For example, the word "sunset" can be expanded to also include annotations such as "sunset", "dusk", "sundown", and "nightfall".

Light infrastructure annotations relate specifically to the rendering of the image by a lighting system. These may be typically about the specific lighting-related data on lighting infrastructure and usage data. These annotations can be added by users or by the usage history of the image by existing users. They might simply add a tag 'suitable for rendering by a lighting system' to an image or indicated in which type of room they used this image content to render a light effect. The annotations might also be added automatically to the image based the properties of the specific set of lighting devices of the users downloading and using the image content. For example, luminaire bulb type (e.g. E27 White), mood (e.g. Ambiance), infrastructure location (e.g. Bedroom), system name (e.g. Hue).

Optionally, an association table 400 such as shown in FIG. 4 is used to convert typical annotations from the image database into light infrastructure properties annotations or vice versa. The table shows just a few examples to illustrate how such associations between image tags and lighting infrastructure queries could look. Such a table defining a mapping from one or more infrastructure tags to one or more semantic tags is particularly useful if the image 300 is only associated with (e.g. stored in memory along with) semantic tags. In these cases, a user can search the database based on an infrastructure property, even though there are no directly matching tags associated with the image 300.

Figure 5:
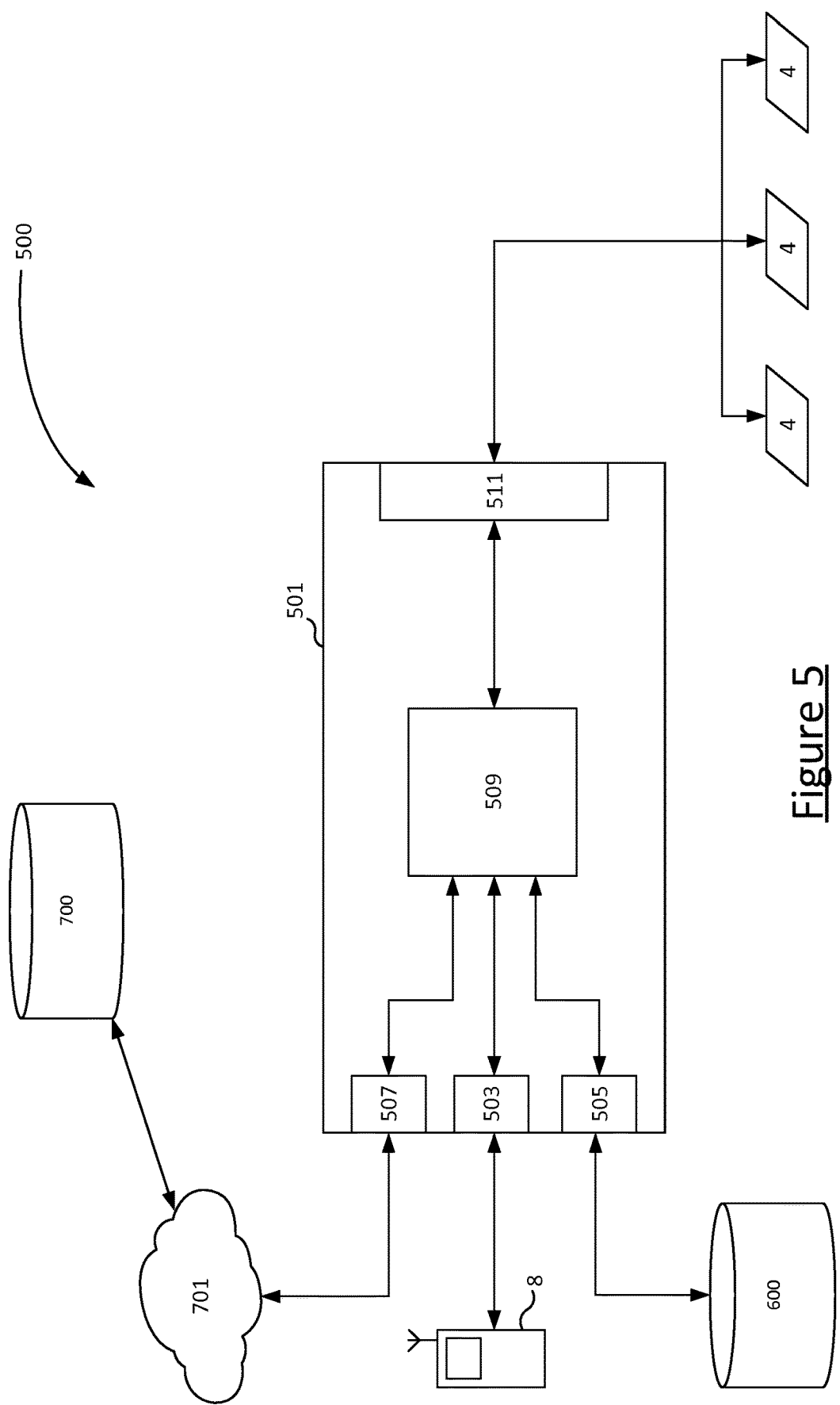
FIG. 5 is a schematic of a control system according to embodiments of the present invention.

FIG. 5 illustrated a control system 500 in accordance with embodiments of the present invention. The control system 500 comprises a (back-end) controller 501, an image database 700, a memory 600, and the user terminal 8 (front-end device) and luminaires 4 from FIG. 1 (three luminaires 4 are shown but in general there may be one or more luminaires 4).

In turn, the controller 501 comprises a first input 503, a second input 505, a third input 507, a processor 509, and a lighting interface 511. The processor 509 is operatively coupled to each of the first input 503, second input 505, third input 507, and lighting interface 511. The controller 501 can be implemented by any suitable computing device in the lighting system e.g. the lighting bridge 6, the user terminal 8, or one of the luminaires 4. Alternatively, the controller 501 may be implemented in a distributed manner with some functionality being implemented in one computing device and other functionality implemented in a second computing device being separate from, and comprising a separate physical entity from, the first computing device. For example, the processor 507 may comprise two processing units: a first processing unit configured to receive user input and search the image database 700 to return an image; and a second processing unit configured to select colours from the returned image and control the luminaires 4 accordingly. The first processing unit may preferably be implemented in the user terminal 8 and the second processing unit may preferably be implemented in the lighting bridge 6, but other implementations are not excluded.

The first input 503 is arranged to receive data from the user terminal 8, particularly user input entered by user 10 via a user interface of the user terminal 8 as mentioned above. The connection from the user terminal 503 to the first input 503 may be by one of more wired or wireless communication channels as is known in the art.

The second input 505 is arranged to at least receive data from the memory 600. As above in relation to the first input 503, this may be via one or more wired or wireless communication means. This may also be via a network such as the Internet, though this is not shown in FIG. 5.

The third input 507 is arranged to send data to and receive data from the image database 700. This data transmission may be by one or more wired or wireless communication means and may be via a network 701 as shown in FIG. 5 (e.g. the Internet).

Note that one or both or the image database 700 and the memory 600 may be internal to the controller 501.

According to techniques disclosed herein, the processor 507 is configured to: receive a trigger for a desired light setting; receive lighting infrastructure properties; select matching image content from database based on lighting infrastructure; and render the image-based light scene. These steps are described in more detail below in relation to the flowchart of FIG. 6.

At step S601, the processor 509 receives a search trigger (request for a light setting) from the user terminal 8 via the first input 503. This trigger comprises at least an indication of at least one user preference e.g. a keyword specifying a mood, color, or other input related to a light setting that the user wishes to create. For example, the user could specify "sunset", "romantic", "relaxation", or "red" to indicate their desired lighting ambiance. The trigger may be implicit (i.e. wherein the act itself of the user providing a keyword to the processor 509 triggers the processor 509 to perform the steps described below), or may require more explicit user input. For example, the user can trigger a light setting request selecting an icon on a GUI of the user terminal 8, touching/pressing a light switch of the lighting system, selecting a color from a color selection device or remote, etc. and then the processor 509 prompts the user to enter a keyword to be used as described below. Alternatively, a detected user presence, activity or mood, a time trigger, a trigger from a connected device (e.g. audio playback device), a sensor value, etc. may also be used to initiate the processor 509 requesting a keyword from the user.

It is appreciated that the explanations given herein with reference to a "keyword" also apply to other forms of user preference which may be indicated by the user 10. For example, the user preference may be a mood, single colour, or combination of colours (a colour palette). In these cases the mood, colour, or palette may be considered a "keyword" in the sense that the mood, colour, or palette can be expressed by a single word (e.g. "calm", "red", "rainbow" etc.).

The user preference may be entered by the user 10 using the user device 8 in any suitable manner. For example: by entering text specifying the user preference via a graphical user interface; by saying a keyword which is detected by a microphone of the user device 8 and converted to text using known voice recognition methods; by selecting a user preference from a list of available preferences displayed on a graphical user interface, such as selecting a user preference colour from a displayed set of colours.

In any case, the processor 509 receives a keyword (e.g. "sunset") at step S601, or otherwise receives an indication of the user's preference from which a user preference can be determined.

At step S602, the processor 509 identifies at least one property of at least one of the luminaires 4 within the environment 2. Lighting infrastructure properties can be the type of lights, shape/position/orientation of lights, associated room type and physical layout. This lighting infrastructure data can be received by the processor 509 module (e.g. smartphone app, bridge) via various means.

The properties may be known a priori (e.g. commissioned and stored to a memory such as memory 600). In this case the information is already available and is simply retrieved from memory 600 by the processor 509. For example, information may be available relating to:

Lighting devices: the luminaire types and their rendering capabilities (e.g. Lightstrip, Brand Names, E27 White Ambiance, GU10 White and Colour Ambiance, etc.)

Rooms: the room name, room type, luminaires in the room (i.e. a lighting control group known in the art).

Additionally, some types of information relating to the manner in which the luminaires 4 are actually deployed in the environment 2 may be made available to the processor 509 by user input (e.g. from user terminal 8). For example, this input might be provided by the user via the user terminal 8 in response to a request by the processor 509 or be learned based on the usage history of the lights. In either case, this information may also be stored to memory 600. Types of information which are particularly suited to being identified by the processor 509 in this manner are, for example, the light orientation, role (functional/decorative), light names, light shape, etc. That is, information which can be altered by the user and as such is unsuited to being specified in a commissioning step.

In the case of additional information relating to the location of the luminaires 4 in the room 2 and the layout of the rooms in the home, the location and layout information might be provided by the user for example using an app running on the user terminal 8 by placing the luminaires 4 on a floor plan layout.

More advanced ways of capturing lighting infrastructure properties (e.g. using camera, light source signals, or sensors) are described in more detail later. In any case, the processor 509 identifies a property of a luminaire 4 and this information is added to the received trigger for the light scene and together form the query to the image-content database. As an example, a user preference may specify "sunset" and the processor 509 identifies that a luminaire 4 is a lightstrip-type luminaire, and then there are two possibilities regarding the formulation of the query (i.e. the manner of the image search):

A—the identified property is transformed (e.g. using a lookup table such as shown in FIG. 4) into a lighting effect terms. In this example this might be "horizon" to represent the lightstrip luminaire. The image search is then performed based on both the user preference and the transformed keyword (i.e. "sunset" and "horizon" in this example).

B—the image search is performed based on the "raw" information. In the above example this would be performing the search based on the words "sunset" and "lightstrip".

Note that it is not essential but may be preferable to also determine the orientation of the luminaire(s), as the transformed keyword can depend on orientation. E.g. a horizontal lightstrip may be classified as "horizon" but a vertical lightstrip may be better classified by "firework" or "tree". Orientation or shape of the light strip could be either detected by (e.g. integrated) sensors in the luminaire, may be specified by a user (e.g. using the user device 8), or may be specified by a commissioner of the system.

Keyword(s) derived from one or more luminaire properties, such as relative locations, orientation, shape etc. capture information about those property(s) in a way that can be matched to expected image tags in the database. As will be appreciated, there are many ways in which such information can be captured suitably depending on the nature of the tags in the database, At step S603, the processor 509 selects matching image content from the image database 700. A search query is formulated to retrieve image content from the image database 700 based on the keyword (received in step S601) and using the identified lighting infrastructure properties to filter or prioritize the search results. It is appreciated that this may comprise searching based on the received keyword and the additional keyword(s) derived from the lighting infrastructure property(s) or may alternatively or additionally comprise searching based on the received keyword and the identified lighting infrastructure property itself.

As an example, the processor 509 formulates a search query to retrieve image content from a database using a keyword ("sunset") and using the received lighting infrastructure properties as attributes to filter the image content. These attributes could be:

[room_type: bedroom];
[light_types: (1, Hue lightstrip); (2, Hue Go); (3, Hue E27 White Ambiance)];
[light_names: (1, under bed); (2, bedside table); (3, ceiling light)]

In any case, the processor 509 performs the image search based on both the keyword and the identified luminaire properties, in contrast to prior art methods which only search based on a keyword. Thus, the search of the present invention returns more relevant images in that the returned images are particularly suited for rendering by the luminaires 4 in the environment 2. That is, the present invention can take into account things like the positions, shape, and/or orientation of the luminaires 4 in returning relevant image results.

The position of a luminaire 4 within the room can be mapped to a related position within an image (e.g. a luminaire location being in the centre of the room can be associated with the centre or central region of an image) and then images having prominent features (e.g. areas of colour, such as identified using image-analysis techniques) in the middle of the image can be considered as "matching".

Similarly, the relative position of two or more luminaires within the environment can be mapped to associated areas of an image and thus the search can be performed to return images having interesting features at those areas. For example, the distance between two luminaires, or the layout of the luminaires in the room. That is, for example, three luminaires may be positioned in the environment in a line, or in a triangle. This arrangement (e.g. an equilateral triangle) can be mapped to a similar (in the geometric sense) arrangement of features in an image, such as identifying images which also have three blocks of colour arranged in a triangle or line, accordingly.

Further, the orientation of the luminaires 4 can also be mapped to features within the images. Particularly for luminaires 4 having a directionality such as spotlights which may illuminate a long, thin region of the environment (e.g. an uplight against a wall) such as identified as a region displaying a coded light illumination (as is known in the art). Images having features with a substantially similar shape to the illumination region can then be searched for. Note that the shape of the luminaire 4 itself may be used rather than the shape of the illumination area. For example, a striplight comprising a linear arrangement of a plurality of individual light sources may be placed in a variety of orientations within the environment which may affect the suitability of different images. For example, a vertical striplight is more suited to images having vertical image features (e.g. a vertical band of colour) than a horizontal striplight.

Further still, the shape of the luminaire(s) 4 can be taken into account. Again, the shape of the luminaire 4 itself or the shape of the illumination provided (e.g. a wide-angle light such as a wall-washer vs a narrow-angle light such as spotlight) may be used. The "shape" of the light output from the luminaire 4 is sometimes called the light output distribution. For example, a wall-washer luminaire may provide a "fan" shaped illumination originating from a point. Images can then be found with features which also exhibit this fan-shape. Note also that more complicated shapes are possible such as rope lighting arranged within the environment which can follow contours of furniture or walls, or even spell out words. Again, images can be found with features that correspond to these shape (e.g. images containing the same word, words, or part of a part).

Other properties of the luminaire(s) are also possible, in manners analogous to the above, such as physical properties e.g. luminaire type; luminaire spatial location within the environment; luminaire shape (e.g. adjustable, retractable, flexible etc.) or luminaire orientation within the environment, or properties of the light output by the luminaire e.g.

light output colour; light output shape or distribution; light output maximum intensity; light output spectral composition.

Figure 6:
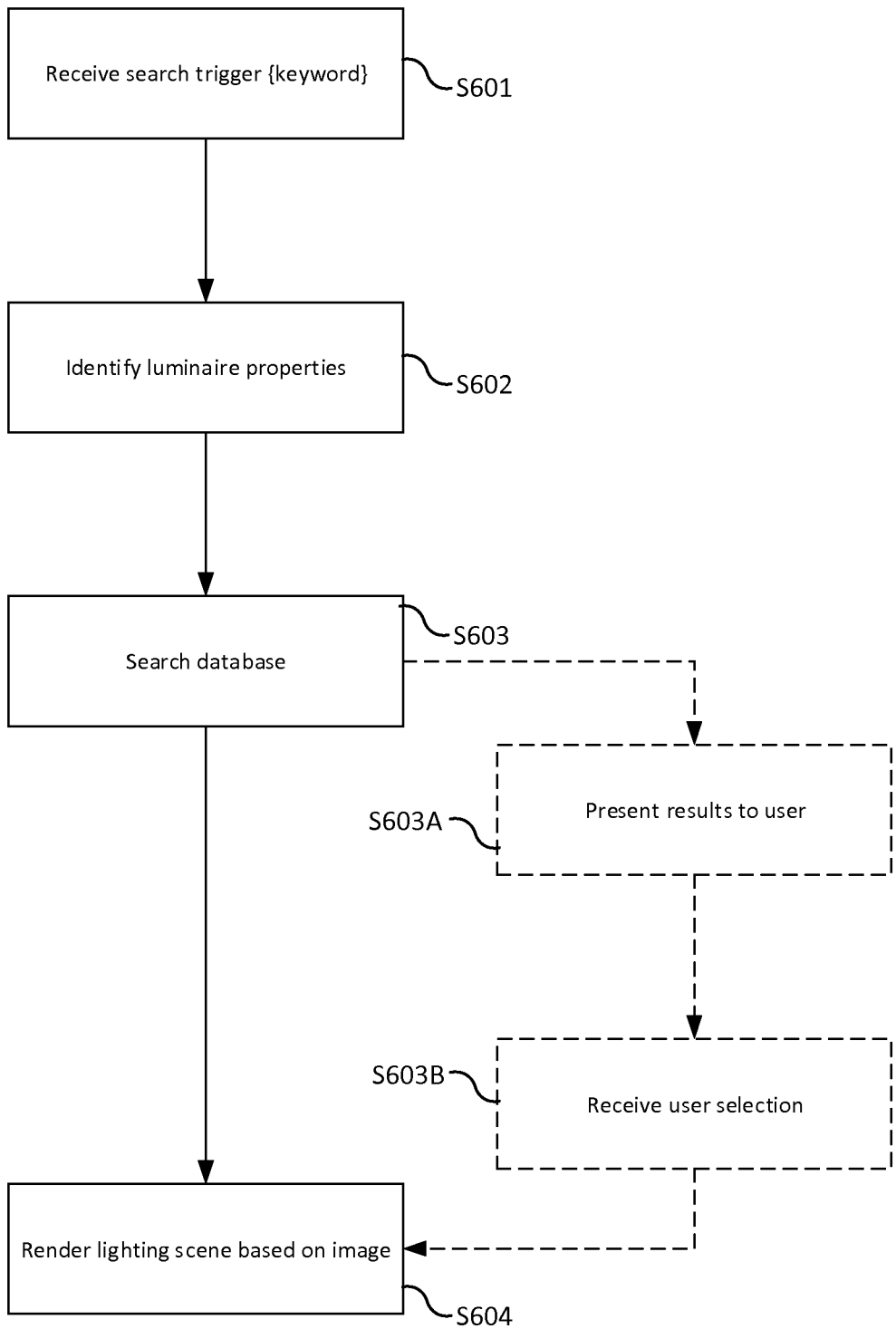
FIG. 6 is a flowchart illustrating a method according to embodiments of the present invention.

FIG. 6 also shows two steps S603A and S603B which need not be performed in all circumstances. In particular, the processor 509 may use a first search result image, or a random one of the returned images as the image from which to render a lighting scene (described in more detail below) but in cases when neither of these apply (i.e. when more than one image is returned from the search and the processor 509 does not know which one of the returned images to use in the light scene rendering), the processor 509 must determine which image to use. In step S603A, the processor 509 transmits, via the first interface 503, the images to the user terminal 8 and they are presented to the user on a graphical user interface (GUI) e.g. as thumbnails or previews of the images which the user can view to make his choice. The user then selects or otherwise identifies the one of the images he wishes the processor 509 to use and an indication of his choice is transmitted from the user terminal 8 to the processor 509 via the first interface 503.

The images presented to the user might be ranked based on their match and/or relevance score for the given lighting infrastructure properties.

Note that step S604 is optional in that the user may only wish to identify an appropriate image for rendering a lighting scene to be stored locally at the user terminal 8 or otherwise stored for later use (e.g. sharing with other users). Conversely, the user may also wish for the determined image to be used in the immediate rendering of a lighting scene.

Although the above has been described in relation to identifying a single image for use by the full set of luminaires 4, it is appreciated that the determined image may be used only to render a lighting scene by a subset of the luminaires 4. Hence, it is also appreciated that multiple (two or more) images may be identified using the above-described searching technique and each determined image may be used to render a separate lighting scene by mutually exclusive (non-overlapping) respective subsets of the luminaires 4. For example, one particular image might be highly relevant to and therefore used for a pixelated strip, but not for other lights in the set of lighting devices.

At step S604 the processor 509 uses the image to perform an image-based lighting scene rendering. The selected image content (i.e. the determined image) is used to render the light setting on the luminaires 4. This can be performed using the method mention in relation for FIG. 2, but other more sophisticated methods are possible in which not only color information but also spatial information, and even temporal information can be extracted from the image-content and used to control the set of luminaires 4.

For example, another option is to match the luminaires 4 to specific image segments based on location information. An example of this is shown in FIG. 7.

Firstly, the user uses a camera (e.g. a camera of the user terminal 8) to capture an image of the environment 2 which is provided to the processor 509. The processor 509 then identifies light sources within the image (e.g. using known coded-light techniques). E.g. if a user captured a particular group of light sources with a camera from a desired viewpoint. Each light source can be annotated based on their location and/or region on the image (e.g. top left, centre, xy coordinates, etc.). This information is than used to find appropriate images, e.g. images that have relevant features in the regions of interest that can be rendered by the lights in the infrastructure. To do so, either the images can be searched using known image processing techniques (e.g. morphological image analysis extracting and describing image component regions in terms of shape and form) to identify images which have relevant regions of interest (e.g. a large colourful area in a portion of the image which corresponds to the location of a luminaire or group of luminaires in the environment, such as annotated by the user for example), or the images can be searched to return images having tags which identify regions of interest. For example, an image might be tagged with "sun in centre" or "two dolphins middle" an example of such an image is shown in FIG. 7. In these cases, images with relevant regions of interest can be determined by the tags rather than requiring image processing as in the former example. However, note that it is possible that the image processing method can be used in the adding of the tags to the images (i.e. by a back-end provider of the image database). Tags may alternatively or additionally be added based on frequent or satisfactory usage of the images as a basis for a light scene (for a specific light scene). Those tags may either be shared to a wider audience, or be private and coupled to the user's own lighting infrastructure (e.g. room) where it was used.

A specific property of the luminaire (e.g. linear and horizontal striplight or spotlight) can be a requirement for the image, i.e. images will need to be found which are both i) known to match the user preference and ii) comprise image features that match that property (e.g. are linear and horizontal). As mentioned above, this can either be derived from the image tags or be determined directly from the image using image processing (e.g. morphological image processing). Basic binary morphology, as is known in the art, can be applied to determine whether or not the image has the specified shape (i.e. specified in the user preference).

In addition, relative positions and/or patterns of luminaires 4 can be used in the image search. Information pertaining to the configuration of the luminaires 4 can be one or more of the following:

a) Information from a manufacturer, e.g. in case of multi-light source per luminaire such as a luminaire having both an upward illuminating light source and a downward illuminating light source.

b) Information from user input, e.g. entered by a user suing a graphical user interface of the user device 8 to place luminaires 4 on a floorplan of the environment.

c) Determined from luminaire wired and/or wireless connectivity data. For example, relative distance between lights using known RF received signal strengths analysis or Zigbee neighbouring tables specifying the network topology (also known in the art).

d) Determined using coded light techniques (mentioned above). In these cases, the positioning information can be formalized in a graph representation with each light point as a node and a line with a distance value. In a similar way, the images can be analysed for interesting regions (e.g. based on tags, extreme colors, etc.) and a graph presentation between these regions as nodes, connected by lines with a value indicating their relative distances. The searching of the database then comprises generating the graph representation of the lighting system, and comparing it with the graph representation of the images in the database to determine a similarity metric for each pair. Image graphs with high degree of similarity with the lighting infrastructure graph (e.g. distance metrics) then get a higher relevance score. The processor 509 can use the highest rated image automatically, or present some of the highest rated images to the user 10 to allow the user 10 to select a desired one of the images. It will be appreciated that the above embodiments have been described only by way of example. Other variations to the disclosed embodiments can be understood and effected by those skilled in the art in practicing the claimed invention, from a study of the drawings, the disclosure, and the appended claims.

For example, there are more advanced solutions for obtaining lighting infrastructure information for the set of luminaries 4. That is, in addition to the basic user input of lighting infrastructure information as described earlier, more advanced or automatic ways of obtaining lighting infrastructure information are possible.

The user may take a picture of a room with the target lighting infrastructure (i.e. the environment 2) using the camera of a smartphone (user terminal 8). Ideally, the picture is taken from a typical viewing point of the user. But also a 360° view can be created by taking a sequence of images or recording a short video. Known image analysis techniques can be used to identify luminaires, their location, shape and size, their orientation, and their light effects. Additionally, key environmental features such as walls, ceiling, tables etc. can be identified. Optionally, the individual luminaires 4 may send out (at least locally to the environment) unique coded light signals such that the camera can identify which luminaires are in the view. It may be beneficial for the processor 509 to outsource the image processing necessary to an external processor having more processing power than the processor 509 itself, but this is optional.

Alternatively or in addition, the luminaires that are part of the infrastructure may communicate their properties to the controller 501 (i.e. via lighting interface 511). These properties (e.g. the type of bulb or other light source of luminaire) can for example be programmed in the luminaire during the manufacturing process or later commissioning stage. Some properties can alternatively be retrieved via sensors on the luminaires 4 themselves, e.g. the orientation of the light, in accordance with known methods. Further, the relative distance between the luminaires can be sensed for example by analysing the RF signal strength of each luminaire relative to the bridge 6 and/or one or more other luminaires.

Another possible extension to the above ideas is to improve future search result matches based on user behaviour. For example, users may be able to explicitly rate the resulting lighting scene on overall preference or the perceived match between resulting lighting scene and their request. The image database 700 then stores the user ratings in association with the respective image, such that future searches can return their results ordered by user rating.

It is appreciated that the above has been described in relation to lighting systems comprising one or more luminaires 4, but other non-lighting devices may also be present such as audio speakers, electronic display devices and olfactory modalities. In these systems, the image search terms (keyword and infrastructure properties) can also include properties of the other devices. The resulting image can then not only be used in rendering a lighting scene but can be used by the other devices to render further effects enhancing the overall atmosphere. For example, a jungle image would be used to render a green-hue lighting scene by the luminaires 4 and jungle noises by the speaker.

Further luminaires may be present within the environment 8 which are not directly intended to provide lighting within the environment but which do affect the total light present, e.g. digital photoframe devices hanging on the wall. These devices can also be included in the ambience creation by the processor 509 determining a lighting effect to be rendered by them in the same manner as the luminaires 4. These types of devices may be able to render some or all of the actual image (rather than just a single colour). Hence, it may be preferable for these devices to display specific prominent foreground elements from the image content.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope

The invention claimed is:

1. A method of searching an image database for images to be used in rendering lighting scene in an environment by multiple luminaires within the environment, the method comprising:
   receiving a search trigger comprising at least one indication of a user preference;
   identifying at least a position of two or more of the multiple luminaires relative to each other; and
   responsive to receiving said search trigger, searching the image database to identify the at least one image as having at least one image feature which corresponds to the relative position of the two or more of the luminaires relative to each other for use in rendering the lighting scene by the two or more luminaires,
   wherein said searching comprises determining an infrastructure keyword from the identified position, and searching the image database based on the user preference and the infrastructure keyword.

2. A method of rendering a lighting scene in an environment comprising causing the method steps of claim 1 to be performed to return the at least one image and further comprising a step of:
   controlling the at least one luminaire to render the lighting scene based on the returned at least one image.

3. The method according to claim 1, wherein the image database stores a plurality of images each stored in association with at least one respective tag.

4. The method according to claim 1, further comprising identifying an additional property of the at least one luminaire within the environment; and wherein said searching the image database is performed additionally based on the identified additional property.

5. The method according to claim 4, wherein the additional property is an orientation of the at least one luminaire within the environment.

6. The method according to claim 5, wherein the additional property is a shape of the at least one luminaire within the environment.

7. The method according to claim 1, wherein said user preference comprises one or more of: a keyword; a mood icon; a colour; and a colour palette.

8. The method according to claim 1, wherein said searching the image databased is performed using an Internet-based image search service.

9. The method according to claim 1, wherein said at least one luminaire is a plurality of luminaires.

10. The method according to claim 1, further comprising steps of:

if more than one image is returned from said search, presenting the more than one image to the user via a user interface; and receiving user input identifying one of the more than one image for use in said rendering.

11. A computer program product comprising computer-executable code embodied on a non-transitory computer-readable storage medium, the computer program product being configured to when executed by one or more processing units, perform the method according to claim 1.

12. A controller of for controlling at least one luminaire to render a lighting scene in an environment based on an image; the controller comprising:

an input for receiving a search trigger comprising at least one indication of a user preference;

an interface for sending control commands to the at least one luminaire; and a processor arranged to:

receive the search trigger;

identifying at least a position of the at least one luminaire relative to each other;

retrieve at least one image by causing, responsive to receiving said search trigger, a search of an image database, at least one image as having at least one image feature which corresponds to the relative position of the two or more of the luminaires relative to each other; and control, via the interface, the two or more luminaires to render the lighting scene based on the retrieved at least one image, wherein said searching comprises determining an infrastructure keyword from the identified position, and searching the image database based on the user preference and the infrastructure keyword.

13. A system comprising the controller according to claim 12 and the at least one luminaire.

* * * * *